(12) United States Patent
Zheng et al.

(10) Patent No.: US 11,609,117 B2
(45) Date of Patent: Mar. 21, 2023

(54) MULTI-LAYER SPECTRAL MODULATION SPECTROMETER

(71) Applicant: ams AG, Premstaetten (AT)

(72) Inventors: Ruitao Zheng, Eindhoven (NL); James Archibald, Eindhoven (NL)

(73) Assignee: AMS AG, Premstaetten (AT)

( * ) Notice: Subject to any disclaimer, the term of this patent is extended or adjusted under 35 U.S.C. 154(b) by 125 days.

(21) Appl. No.: 17/264,612

(22) PCT Filed: Jul. 30, 2019

(86) PCT No.: PCT/EP2019/070418
§ 371 (c)(1),
(2) Date: Jan. 29, 2021

(87) PCT Pub. No.: WO2020/025569
PCT Pub. Date: Feb. 6, 2020

(65) Prior Publication Data
US 2021/0293619 A1 Sep. 23, 2021

Related U.S. Application Data

(60) Provisional application No. 62/711,765, filed on Jul. 30, 2018.

(51) Int. Cl.
G01J 3/02 (2006.01)
G01J 3/28 (2006.01)

(52) U.S. Cl.
CPC .......... G01J 3/0229 (2013.01); G01J 3/2803 (2013.01); G01J 2003/2806 (2013.01); G01J 2003/2836 (2013.01)

(58) Field of Classification Search
CPC ....... G01J 2003/2806; G01J 2003/2836; G01J 3/0205; G01J 3/0229; G01J 3/0256; G01J 3/28; G01J 3/2803; G01J 3/2846
See application file for complete search history.

(56) References Cited

U.S. PATENT DOCUMENTS 6,859,275 B2  2/2005 Fateley et al.
7,330,314 B1* 2/2008 Cobb .................. G02B 27/148
                                                    362/241

(Continued)

FOREIGN PATENT DOCUMENTS

EP    2570785 A1    3/2013

OTHER PUBLICATIONS

Xing Lin et al: "Dual-coded compressive hyperspectral imaging", Optics Letters, Optical Society of America, us, vol. 39, No. 7, Apr. 1, 2014 (Apr. 1, 2014), pp. 2044-2047, XP001589290, ISSN: 0146-9592, DOI: 0.1364/OL.39.002044 [retrieved on Mar. 26, 2014] figures 1,3.

(Continued)

Primary Examiner — Hina F Ayub
(74) Attorney, Agent, or Firm — Viering, Jentschura & Partner MBB

(57) ABSTRACT

A system includes a first spectral modulator, a second spectral modulator, a light guide optically, a photodetector, and an electronic control device. The first spectral modulator receives sample light, and modulates the sample light according to a first spectral response pattern to produce first modulated light. The second spectral modulator receives the first modulated light from the first spectral modulator via the light guide, modulates the first modulated light according to a second spectral response pattern to produce second modulated light, and transmits the second modulated light to the photodetector. The photodetector measures an intensity of the second modulated light incident on the photodetector, and generates one or more signals corresponding to the intensity of the second modulated light. The electronic control device determines a spectral distribution of the sample light based on the one or more signals.

16 Claims, 10 Drawing Sheets

(56) References Cited

U.S. PATENT DOCUMENTS

| | | | |
|---|---|---|---|
| 2003/0033938 A1 | 2/2003 | Jung et al. | |
| 2004/0125600 A1* | 7/2004 | Fushimi | G03B 21/005 362/268 |
| 2008/0123097 A1 | 5/2008 | Muhammed et al. | |
| 2009/0040616 A1* | 2/2009 | Lin | G01J 3/02 359/579 |
| 2018/0136042 A1* | 5/2018 | Goldring | G01J 3/2803 |

OTHER PUBLICATIONS

Hoover Rueda et al: "Multi-spectral compressive snapshot imaging using RGB image sensors", Optics Express, vol. 23, No. 9, May 4, 2015 (May 4, 2015), p. 12207, XP055420666, us ISSN: 2161-2072, DOI: 10.1364/OE.23.012207 figures 8, 9, 11.

Toyooka S et al: "Two-dimensional spectral analysis using broadband filters", Optics Communications, Elsevier Amsterdam, NL, vol. 137, No. 1-3, Apr. 15, 1997 (Apr. 15, 1997), pp. 22-26, XP004091509, ISSN: 0030-4018, DOI: 10.1016/S0033-018(97)82008-1 the whole document.

Jie Bao et al: "A colloidal quantum dot spectrometer", Nature, vol. 523, No. 7558, Jul. 1, 2015 (Jul. 1, 2015), pp. 67-70, XP055465070, London ISSN: 0028-8036, DOI: 10.1038/nature14576 the whole document.

\* cited by examiner

MULTI-LAYER SPECTRAL MODULATION SPECTROMETER

RELATED APPLICATIONS

The present invention is a U.S. National Stage under 35 USC 371 patent application, claiming priority to Serial No. PCT/EP2019/070418, filed on 30 Jul. 2019; which claims priority of U.S. 62/711,765, filed on 30 Jul. 2018, the entirety of both of which are incorporated herein by reference.

TECHNICAL FIELD

The disclosure relates to spectrometers.

BACKGROUND

A spectrometer is an instrument used to measure a light spectrum of sample light (e.g., to determine the spectral components of ultraviolet, visible, and/or infrared light). In some cases, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

A light spectrum can be measured in different ways, such as through direct measurement or indirect measurement. As an example, a spectrometer configured for direct measurement can separate different wavelengths of light spatially (e.g., using wavelength dispersive devices, such as diffractive gratings or prisms), and measure the power distribution of each wavelength of light individually (e.g., to "directly" measure the spectrum with respect to specific wavelengths).

As another example, a spectrometer configured for indirect measurement can modulate light according to a series of known spectral modulation patterns, and obtain measurements of the modulated light. Each measurement provides information carried by multiple wavelengths and according to different weights, and can be used to reconstruct the spectrum of the original light (e.g., using a multiplexing technique).

SUMMARY

This disclosure describes implementations of a multi-layer spectral modulation spectrometer. In an example implementation, a spectrometer includes two spectral modulators optically coupled via a light guide. The spectrometer receives sample light, modulates the sample light using a first spectral modulator according to a first known spectral response pattern (e.g., according to a first transfer function), and modulates the resulting light using a second spectral modulator according to a second known spectral response pattern (e.g., according to a second transfer function). The twice-modulated light is measured using one or more photodetectors. Several additional measurements at obtained (e.g., by modulating the light using different combinations of spectral response patterns), and the measurements used to reconstruct the spectrum of the original light (e.g., using a multiplexing technique).

Implementations of this spectrometer can provide various benefits in some instances. For example, spectrometers that measure a light spectrum using a direct measurement technique often require one or more wavelength dispersive devices (e.g., diffractive gratings or prisms) to separate wavelength of the light spatially. However, such devices are often relatively large. In contrast, implementations of the multi-layer spectral modulation spectrometer described in this disclosure do not require the use of wavelength dispersive devices, and thus can more easily be miniaturized. In some cases, the spectrometer can be sufficiently small such that it can be used in portable or mobile devices (e.g., a smart phone, tablet computer, a hand-held instrument, or other such device).

As another example, spectrometers that measure a light spectrum using an indirect measurement technique (e.g., using a single layer of spectral modulators) often require a large number of different spectral modulators (e.g., a large number of different filters). In contrast, implementations of the multi-layer spectral modulation spectrometer described in this disclosure can be constructed using a smaller number of spectral modulators while still providing similar or improved analytical performance. Accordingly, the multi-layer spectral modulation spectrometer can be constructed using less expensively, using fewer components, and/or using a less complex manufacturing procedure.

As another example, implementations of the multi-layer spectral modulation spectrometer can be constructed without the use of complex optics. Accordingly, the spectrometer can be produced in a more cost effective manner.

In an aspect, a system includes a first spectral modulator, a second spectral modulator, a light guide optically coupling the first spectral modulator and the second spectral modulator, a photodetector, and an electronic control device communicatively coupled to the photodetector. The first spectral modulator is operable to receive sample light, and modulate the sample light according to a first spectral response pattern to produce first modulated light. The second spectral modulator is operable to receive the first modulated light from the first spectral modulator via the light guide, modulate the first modulated light according to a second spectral response pattern to produce second modulated light, and transmit the second modulated light to the photodetector. The photodetector is operable to measure an intensity of the second modulated light incident on the photodetector, and generate one or more signals corresponding to the intensity of the second modulated light. The electronic control device is operable to determine a spectral distribution of the sample light based on the one or more signals.

Implementations of this aspect can include one or more of the following features.

In some implementations, the first spectral modulator can include a plurality of first light filters, each first light filter having a respective spectral response pattern that differs from a spectral response pattern of each of the other first light filters. The first spectral modulator can include, for each first light filter, a respective first light regulation device operable to regulate the transmission of sample light into or out of the first light filter. The first light regulation devices can include liquid crystal spatial light modulators (SLMs). The first spectral modulator can be operable to modulate the sample light according to the first spectral response pattern by selectively actuating one or more of the first light regulation devices of the first spectral modulator. The second spectral modulator can include a plurality of second light filters, each second light filter having a respective spectral response pattern that differs from a spectral response pattern of each of the other second light filters. The second spectral modulator can include, for each second light filter, a respective second light regulation device operable to regulate the transmission of sample light into or out of the second light filter. The second light regulation devices can include liquid crystal spatial light modulators (SLMs). The second spectral modulator can be operable to modulate the first modulated light according to the second spectral response pattern by selectively actuating one or more of the second light regulation devices of the second spectral modulator.

In some implementations, the first spectral modulator can include a plurality of light channels. Each light channel of the first spectral modulator can include a plurality of first light filters, each first light filter having a respective spectral response pattern that differs from a spectral response pattern of each of the other first light filters of that light channel, and a plurality of first light regulation devices operable to regulate the transmission of light into or out of the first light filters. The first spectral modulator can be operable to modulate the sample light according to the first spectral response pattern by selectively actuating one or more of the first light regulation devices of one or more of the light channels of the first spectral modulator. The light guide can include a plurality of light channels. Each light channel of the light guide can include a respective light guide operable to receive first modulated light from a corresponding light channel of the first spectral modulator, and mix the first modulated light. The second spectral modulator can include a plurality of light channels. Each light channel of the second spectral modulator can include a respective second light filter, each second light filter having a respective spectral response pattern that differs from a spectral response pattern of each of the other second light filters. The second spectral modulator can further include, for each light channel, a respective second light regulation device operable to regulate the transmission of light into or out of the second spectral modulator. The second spectral modulator can be operable to modulate the first modulated light according to the second spectral response pattern by selectively actuating one or more of the second light regulation devices of the second spectral modulator. The photodetector can include a plurality of light channels. Each light channel of the photodetector can include a respective photodetector element operable to measure an intensity of the second modulated light received from a corresponding light channel of the second spectral modulator. The photodetector can include a single photodetector element operable to measure an intensity of the second modulated light received from any of the light channels of the second spectral modulator.

In some implementations, the system can further include a diffuser operable to diffuse the sample light and transmit the diffused sample light to the first spectral modulator.

The details of one or more implementations are set forth in the accompanying drawings and the description below. Other features and advantages will be apparent from the description and drawings, and from the claims.

DETAILED DESCRIPTION

This disclosure describes implementations of a multi-layer spectral modulation spectrometer. In an example implementation, a spectrometer includes two spectral modulators optically coupled via a light guide. The spectrometer receives sample light, modulates the sample light using a first spectral modulator according to a first known spectral response pattern (e.g., according to a first transfer function), and modulates the resulting light using a second spectral modulator according to a second known spectral response pattern (e.g., according to a second transfer function). The twice-modulated light is measured using one or more photodetectors. Several additional measurements at obtained (e.g., by modulating the light using different combinations of spectral response patterns), and the measurements used to reconstruct the spectrum of the original light (e.g., using a multiplexing technique). In some cases, the spectrum of the original light can be reconstructed using a least square algorithm.

In some cases, the spectral modulator includes one or more different filters, each having a different spectral response pattern. Further, the spectral modulators can regulate the passage of light into and/or out of the filters through the use of light regulation devices, such as a liquid crystal spatial light modulators (e.g., to selectively block or allow transmission of light into and/or out of the filters). Accordingly, the light regulation devices can be selectively controlled to modulate light according to one or more different filters, either individually or in combination, thereby enabling light to be modulated according to several different spectral response patterns. Multiple measurements of differently modulated light are collected (e.g., using one or more photodetectors), and the measures are used to reconstruct the original spectrum. Further, in some cases, a photodetector can include multiple channels. Each channel of photodetector can be covered by an individual filter and weighted differently (e.g., by gain/integration time settings or weighting factors).

Figure 1:
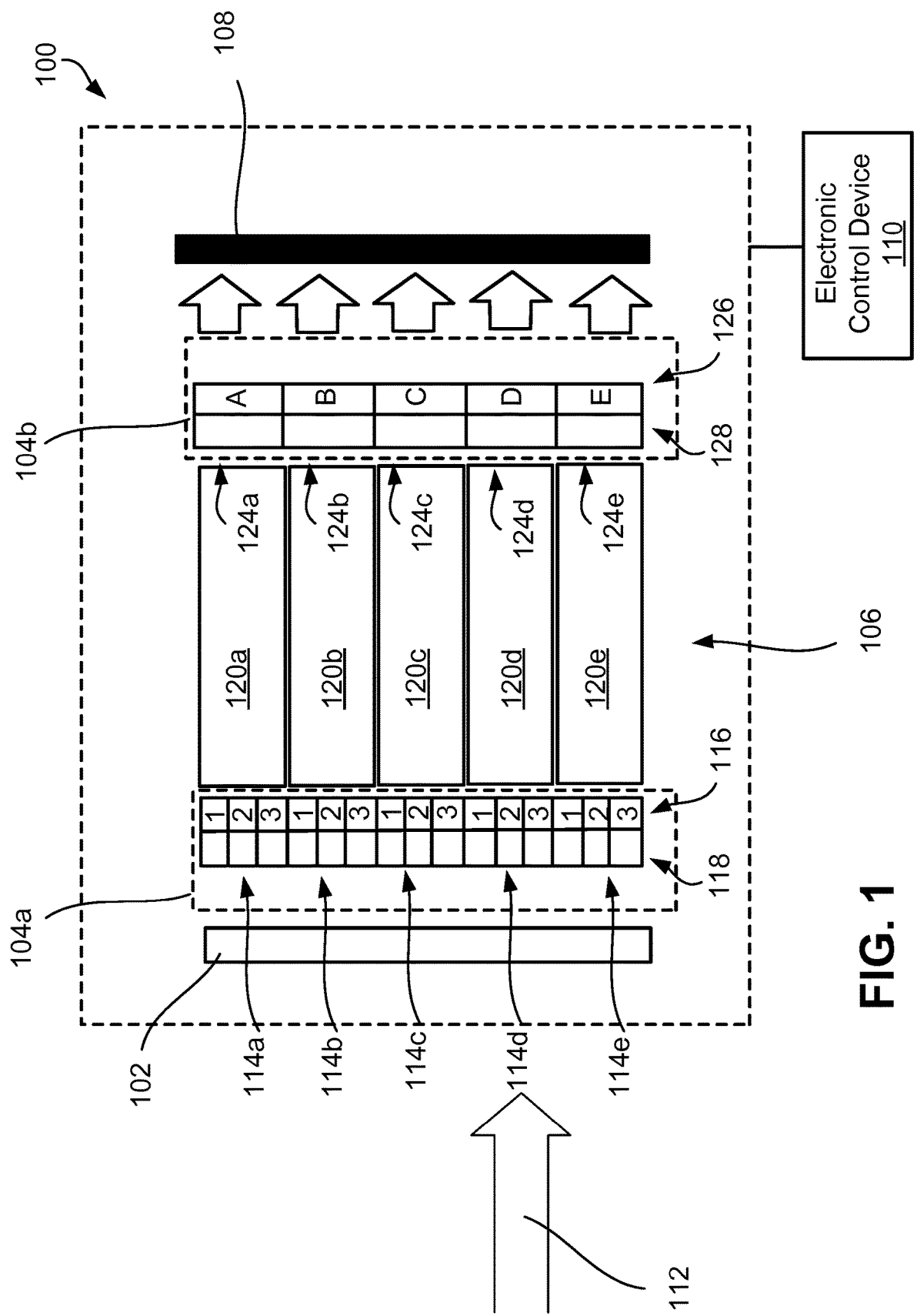
FIG. 1 is a schematic diagram of an example spectrometer.

As shown in FIG. 1, a spectrometer 100 includes a diffuser 102, a first spectral modulator 104a, a second spectral modulator 104b, a light guide 106, a photodetector 108, and an electronic control device 110.

In an example usage of the spectrometer 100, the spectrometer 100 receives sample light 112, and directs the sample light 112 through the diffuser 102. The diffuser 102 diffuses the sample light 112, such that a directional dependency of the sample light 112 is reduced. For instance, the diffuser 102 can receive the sample light 112 according to a particular incident angle or range of incident angles, and scatter the sample light 112 such that it exits the diffuser 102 according to multiple transmission angles or a range of transmission angles wider than the range of incident angles. This can be useful, for example, in maintaining a more constant output light distribution on different incident light angles (e.g., to improve the consistency of measurements by the spectrometer 100). Example diffusers 102 include optic devices having one or more translucent materials, such as ground glass, polytetrafluoroethylene (e.g., TEFLON™), holographs, opal glass, and greyed glass, among others.

The diffused light is directed to the first spectral modulator 104*a*, which modulates the light according to a first spectral response pattern. The first spectral modulator 104*a* can include multiple different channels to modulate light in different ways. For instance, in the example shown in FIG. 1, the first spectral modulator 104 includes five channels 114*a-e*, corresponding to five channels 124*a-e* of the second spectral modulator 104*b*, respectively. Each channel 114*a-e* is optically isolated from the other channels 114*a-e*, such that light from the channel does not enter into another channel.

Each channel 114*a-e* includes a set of filters 116 and a corresponding set of light regulation devices 118. For instance, in the example shown in FIG. 1, each channel 114*a-e* includes three different filters 116 and three corresponding light regulation devices 118. The light regulation devices 118 spatially modulate light and regulate the passage of light into or out of the filters 116. For instance, each of the light regulation devices 118 can be controlled individually to block or allow transmission of light into or out of a corresponding filter 116 selectively. In some cases, the light regulation devices 118 can be operated such that light is transmitted through a single filter 116 in the channel (e.g., by optically blocking all of the filters except for one). In some cases, the light regulation devices 118 can be operated such that light is transmitted through multiple filters 116 in the channel (e.g., by optically blocking some of the filters, or not blocking any of the filters). In some cases, the light regulation devices 118 can allow for the partial transmission of light through one or more filters 116 (e.g., to "weight" filters differently). In some cases, the light regulation devices 118 are liquid crystal spatial light modulators. In some cases, the light regulation devices 118 are controlled using the electronic control device 110.

For each channel 114*a-e*, each of the filters 116 of that channel is configured to transmit light according to a spectral response pattern different from a spectral response of each of the other filters 116 of that channel. For instance, in the example shown in FIG. 1, each channel 114*a-e* includes three different filters 116, each configured to transmit light differently from each of the other filters of that channel.

In some cases, a filter 116 can be configured to attenuate certain wavelengths of light, while allowing for the transmission of other wavelengths of light. For instance, each filter 116 in a set can be a different "color" filter. As an example, as shown in FIG. 1, a set of filters 116 can include a red filter (e.g., a filter that selectively transmits wavelengths of light corresponding to the color red) indicated by the numeral "1", a green filter (e.g., a filter that selectively transmits wavelengths of light corresponding to the color green) indicated by the numeral "2", and a blue filter (e.g., a filter that selectively transmits wavelengths of light corresponding to the color blue) indicated by the numeral "3."

The light regulation devices 118 can be controlled to filter light using one or more of these filters, either individually or in combination (e.g., to filter light selectively according to a red filter, a blue filter, a green filter, or any combination thereof). Further, the light regulation devices 118 can be controlled to impart a spatial modulation to the light with respect to the one or more selected filters. Accordingly, light can be spatially modulated with respect to particular wavelengths or a range of wavelengths, depending on the filters that are selected.

Although example color filters are shown in FIG. 1, these filters are merely illustrative examples. In practice, other types of filters can be used, either instead of, or in addition to, those shown.

In some cases, each of the channels 114*a-e* includes a similar set of filters 116. For instance, in the example shown in FIG. 1, each channel 114*a-e* includes a similar set of filters 116 (e.g., a red filter, a green filter, and a blue filter). In some cases, some or all of the channels 114*a-e* can include a different set of filters 116 than each of the other channels.

The modulated light from the first spectral modulator 104*a* is transmitted into the light guide 106. The light guide 106 can include multiple channels, each configured to receive light from a corresponding channel of the first spectral modulator 104*a*. For instance, in the example shown in FIG. 1, the light guide 106 includes five channels 120*a-e*, each configured to receive light from a corresponding one of the channels 114*a-e* of the first spectral modulator 104*a*. The light guide 106 mixes the modulated light, and transmits the light to second spectral modulator 104*b*.

The second spectral modulator 104*b* modulates the light according to a second spectral response pattern. The second spectral modulator 104*b* can include multiple different channels to modulate light in different ways. For instance, in the example shown in FIG. 1, the second spectral modulator 104*b* includes five channels 124*a-e*, each having a respective filter 126 and light regulation device 128. Each channel 124*a-e* is configured to receive light from a corresponding one of the channels 120*a-e* of the light guide 106, and modulate the light according to a different respective filter 126.

Each of the filters 126 is configured to transmit light according to a spectral response pattern different from a spectral response of each of the other filters 126. For instance, in the example shown in FIG. 1, the second spectral modulator 104*b* includes five different filters 126, each configured to transmit light differently from each of the other filters 126.

In a similar manner as described with respect to filters 116, a filter 126 can be configured to attenuate certain wavelengths of light, while allowing for the transmission of other wavelengths of light. Similarly, each filter 126 in a set can be a different "color" filter. As an example, as shown in FIG. 1, the filters 126 can include a red filter (indicated by the letter "A"), an orange filter (indicated by the letter "B"), a green filter (indicated by the letter "C"), a yellow filter (indicated by the letter "D"), and a blue filter (indicated by the letter "E").

Similarly, the light regulation devices 128 can be controlled to filter light using one or more of these filters, either individually or in combination. Further, the light regulation devices 128 can be controlled to impart a spatial modulation on the light with respect to the one or more selected filters. Accordingly, light can be spatially modulated with respect to particular wavelengths or a range of wavelengths, depending on the filters that are selected. In some cases, the light regulation devices 128 can be controlled using the electronic control device 110.

Similarly, although example color filters are described, these filters are merely illustrative examples. In practice, other types of filters can be used, either instead of, or in addition to, those shown.

The first spectral modulator 104*a* and the second spectral modulator 104*b* can be controlled in conjunction (e.g., using the electronic control device 110) to transmit light through different combinations of filters 116 and 126, such that the light is modulated according to different spectral modulation patterns. For instance, in the example shown in FIG. 1, light can be modulated according to filters "1" and "A" by selectively transmitting modulated light through the filter "1" in the channel 114a of the first spectral modulator 104a and the filter "A" in the channel 124a of the second spectral modulator 104b, while blocking the transmission of light through other filters (e.g., by selectively operating light regulation devices 118 and 128). As another example, light can be modulated according to filters "3" and "B" by selectively transmitting modulated light through the filter "3" in the channel 114b of the first spectral modulator 104a and the filter "B" in the channel 124b of the second spectral modulator 104b, while blocking the transmission of light through other filters (e.g., by selectively operating light regulation devices 118 and 128). Similarly, light can be modulated according to other combinations of filters 116 and 126.

In some cases, light can be modulated according to multiple different filters of the first spectral modulator 104a in conjunction. As another example, light can be modulated according to filters "2," "3," and "D" by selectively transmitting modulated light through the filters "2" and "3" in the channel 114d of the first spectral modulator 104a and the filter "D" in the channel 124d of the second spectral modulator 104b, while blocking the transmission of light through other filters (e.g., by selectively operating light regulation devices 118 and 128).

In some cases, light can be modulated according to multiple different filters of the second spectral modulator 104b in conjunction. As another example, light can be modulated according to filters "1," "A" and "C" by selectively transmitting modulated light through the filters "1" in the channels 114a and 114c of the first spectral modulator 104a, the filter "A" in the channel 124a of the second spectral modulator 104b, and the filter "C" in the channel 124c of the second spectral modulator 104b, while blocking the transmission of light through other filters (e.g., by selectively operating light regulation devices 118 and 128).

Similarly, in some cases, light can be modulated according to multiple different filters of the first spectral modulator 104a and multiple different filters of the second spectral modulator 104b in conjunction.

In some cases, the light regulation devices 118 and 128 can allow for the partial transmission of light through one or more filters 116 and 126 (e.g., to "weight" filters differently).

In some cases, the light regulation devices 118 and 128 also can modulate the transmission of light through one or more of the filters 116 and/or 126 individually. For example, the light regulation devices can be liquid crystal spatial light modulators that use Faraday rotation introduced by liquid crystal layers to control the transmission of polarized light. These devices can include a rear polarizer, a liquid crystal rotator with a conductive film enabling an electric field to be applied on the liquid crystal rotator, and a front polarizer. Light can be spatially modulated by varying the applied electric field (e.g., using the electronic control device 110).

Modulated light is transmitted from the second spectral modulator 104b to the photodetector 108. The photodetector 108 measures the modulated light (e.g., the intensity of light), and transmits the measurements to the electronic control device 110. Example photodetectors include photoemission or photoelectric devices, semiconductor devices, photovoltaic devices, thermal devices, or photochemical devices operable to convert light photons into electric current.

The spectrometer 100 can modulate light according to multiple different spectral response patterns in succession, and obtain measurements of the light according to each spectral response pattern. Further, the electronic control device 110 can retrieve information regarding the spectral response patterns of each of the filters 116 and 126 and light regulation devices 118 and 128 (e.g., information based on manufacturers' specifications of the filters and light regulation devices and/or previously conducted spectral response analyses of the filters and light regulation devices). Based on the measurements and the information regarding the filters and the light regulation devices, the electronic control device 110 can reconstruct the spectrum of the original light (e.g., using a multiplexing technique). For instance, each measurement provides information carried by multiple known wavelengths and according to different known weights (e.g., determined based on the information regarding the spectral response patterns of each of the filters 116 and 126 and light regulation devices 118 and 128). Accordingly, the electronic control device 110 can form a sensing matrix using information from each of these measurements and known properties. The electronic control device 110 can reconstruct the original spectrum of the sample light 112 using the sensing matrix, for instance, using the least square algorithm, Fourier transformations, or Hadamard transformations. Example calculation techniques are described in greater detail below.

Although the spectrometer 100 shown in FIG. 1 includes a first spectral modulator 104a having sets of three filters for each channel and a second spectral modulator 104b having five channels and corresponding filters, this is merely an illustrative example. In practice, a spectrometer 100 can include any number of filters for each channel of the first spectral modulator 104a (e.g., one, two, three, four, or more), and any number of channels and corresponding filters for the second spectral modulator 104b (e.g., one, two three, four, or more).

In the example shown in FIG. 1, a spectrometer 100 includes a single photodetector 108 for measuring modulated light across multiple different channels (e.g., modulated light transmitted from channels 124a-e of the second spectral modulator 104b. However, this need not be the case. For instance, in some implementations, multiple different photodetectors (e.g., an array of photodetectors) can be used to measure modulated light.

Figure 2:
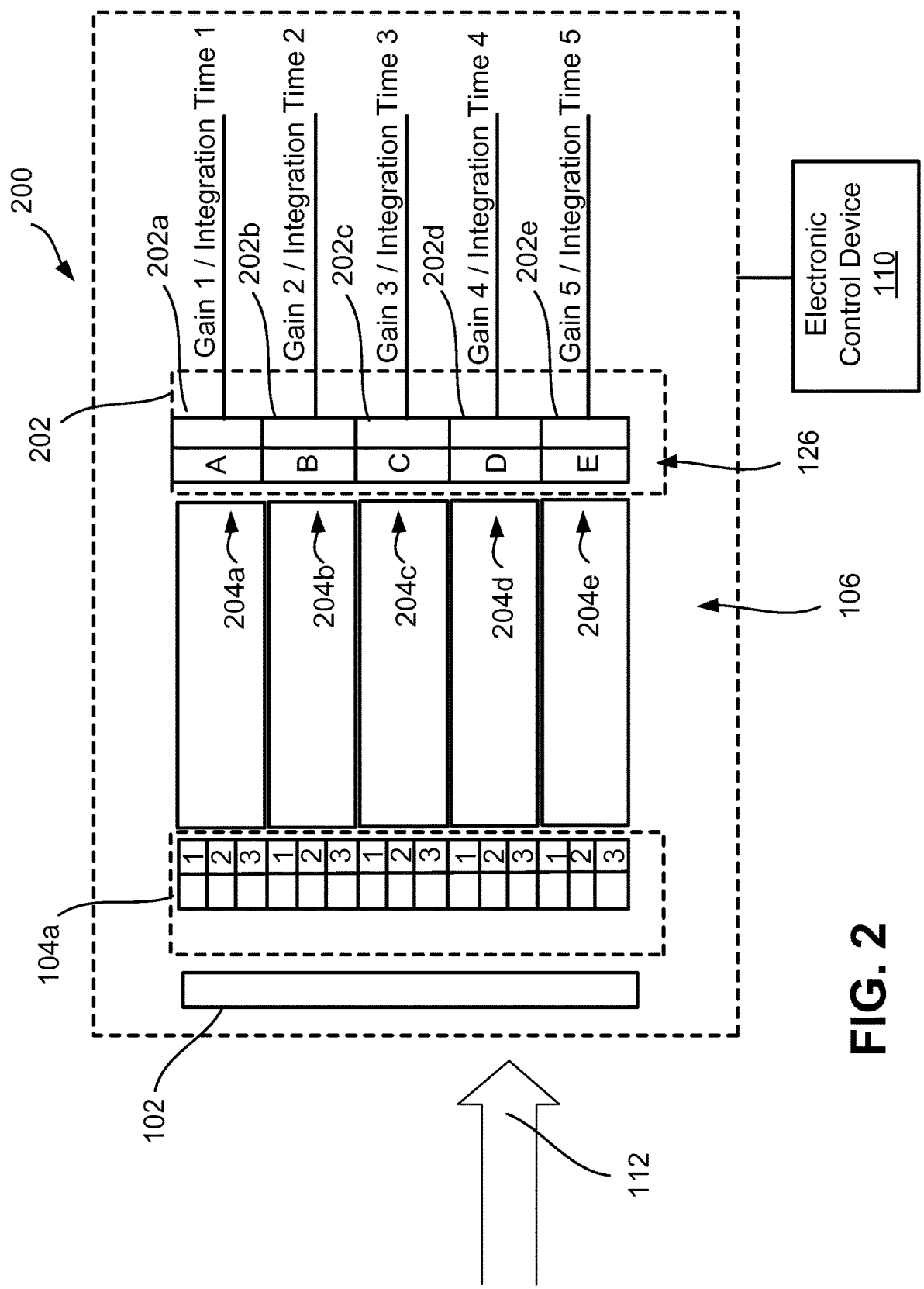
FIG. 2 is a schematic diagram of another example spectrometer.

As an example, FIG. 2 shows another spectrometer 200. In general, the spectrometer 200 is similar to the spectrometer shown in 100. For instance, the spectrometer 200 includes a diffuser 102, a first spectral modulator 104a, a light guide 106, and an electronic control device 110, each of which can be similar to those shown in FIG. 1.

However, in this example of FIG. 2, the spectrometer includes a different second spectral modulator 250. The second spectral modulator 250 modulates the light according to a second spectral response pattern different from that of the first spectral modulator 104a. The second spectral modulator 250 can include multiple different channels to modulate light in different ways. For instance, in the example shown in FIG. 2, the second spectral modulator 104b includes five channels 204a-e, each having a respective filter 126. The filters 126 can be similar to those described with respect to FIG. 1. Further, each channel 204a-e is configured to receive light from a corresponding one of the channels of the light guide 106, and modulate the light according to a different respective filter 126.

Further, the second spectral modulator 250 includes an array of photodetectors 202a-e, each configured to measure modulated light (e.g., the intensity of light) from a corresponding one of the channels 204a-e, and transmit the measurements to the electronic control device 110. Example photodetectors include photoemission or photoelectric devices, semiconductor devices, photovoltaic devices, thermal devices, or photochemical devices operable to convert light photons into electric current.

This configuration can provide various benefits. For example, because the spectrometer 200 includes several different photodetectors 202a-e optically isolated from one another, the spectrometer 200 can measure light modulated according to multiple different modulation patterns simultaneously. For instance, some or all of the photodetectors 202a-e can be operated in conjunction to measure light that has been modulated by a different respective modulation pattern (e.g., in accordance with the spectral modulation patterns imparted by different channels of the first spectral modulation 104a and the second spectral modulator 250). This can be beneficial, for example, in increasing the efficiency of the spectrometer 200.

Further, the measurements from each of the photodetectors 202a-e can be weighted differently relative to measurements from each of the other photodetectors 202a-e. For instance, each of the photodetectors 202a-e can be operated according to a particular gain (e.g., signal gain for electric current generated by the photodetector due to incident light) and/or according to a particular integration time (e.g., corresponding to the length during which the photodetector 202a-e measures light to obtain a particular light intensity measurement). These parameters can be controlled selectively for each of the photodetectors 202a-e (e.g., using the electronic control device 110). This can be beneficial, for example, in improving the effectiveness of the spectrometer 200 (e.g., by providing additional adjustable factors or weights to provide additional information regarding the light spectrum, and to improve the accuracy of the light spectrum estimation).

Although the spectrometer 200 shown in FIG. 2 includes a first spectral modulator 104a having sets of three filters for each channel and a second spectral modulator 250 having five channels and corresponding filters, this is merely an illustrative example. In practice, a spectrometer 200 can include any number of filters for each channel of the first spectral modulator 104a (e.g., one, two, three, four, or more), and any number of channels and corresponding filters for the second spectral modulator 250 (e.g., one, two three, four, or more).

In the examples shown in FIGS. 1 and 2, each of the spectrometers 100 and 200 includes a first spectral modulator 104 and a light guide 106, each with multiple different channels (e.g., for differently modulating and filtering light in each of the channels). However, this need not be the case. For instance, in some implementations, a first spectral modulator and a light guide can each include a single channel.

Figure 3:
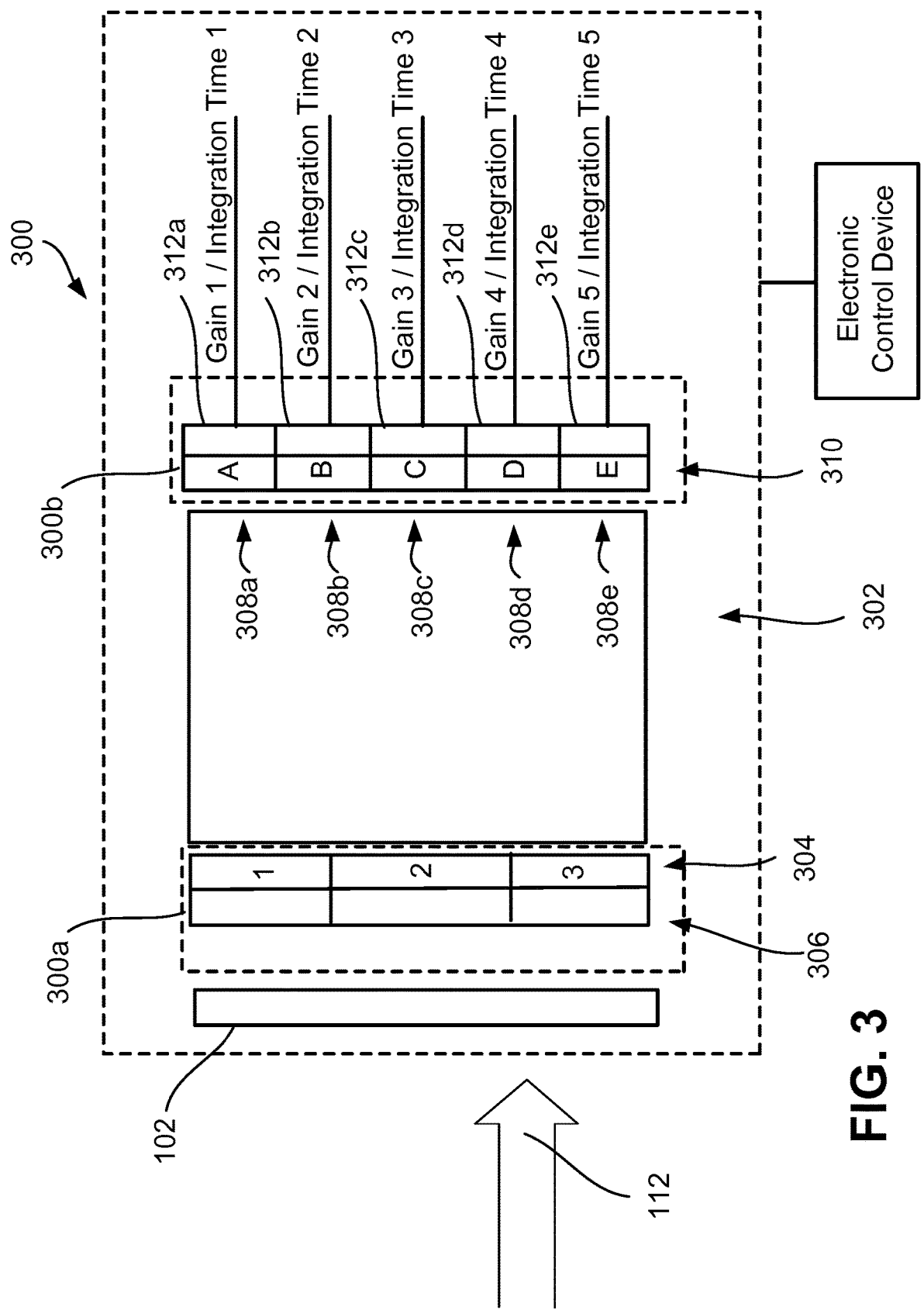
FIG. 3 is a schematic diagram of another example spectrometer.

As an example, FIG. 3 shows another spectrometer 300. The spectrometer 300 includes a diffuser 102, a first spectral modulator 300a, a second spectral modulator 300b, a light guide 302, and an electronic control device 110. In general, the diffuser 102 and the electronic control device 110 can be similar to those described with respect to FIGS. 1 and 2.

However, in this example, the first spectral modulator 300a includes only a single channel, with a single set of filters 304 and corresponding light regulation devices 306 (e.g., in contrast with the first spectral modulator 104a having five different channels, as shown in FIGS. 1 and 2). Further, the light guide 302 includes only a single channel for receiving modulated light from the first spectral modulator 300a and transmitting the light to the second spectral modulator 300b (e.g., in contrast with the light guide 106 having five different channels, as shown in FIGS. 1 and 2).

In an example usage of the spectrometer 300, the spectrometer 100 receives sample light 112, and directs the sample light 112 through the diffuser 102. The diffuser 102 diffuses the sample light 112, such that a directional dependency of the sample light 112 is reduced (e.g., in a similar manner as described with respect to FIG. 1).

The diffused light is directed to the first spectral modulator 300a, which modulates the light according to a first spectral response pattern. The first spectral modulator 300a includes a single channel to modulate the light, and includes a single set of filters 304 and corresponding light regulation devices 306. The filters 304 and the light regulation devices 306 can operate similarly as the filters 116 and light regulation devices 118 described with respect to FIG. 1. For instance, the light regulation devices 306 can modulate light spatially, and regulate the passage of light into or out of the filters 304. Further, each of the filters 304 can be configured to transmit light according to a spectral response pattern different from a spectral response of each of the other filters 304, and each can be configured to attenuate certain wavelengths of light, while allowing for the transmission of other wavelengths of light. Accordingly, light can be spatially modulation with respect to particular wavelengths or range of wavelengths, depending on the filters that are selected.

Although example filters are shown in FIG. 3, these are merely illustrative examples. In practice, other types of filters can be used, either instead of or in addition to those shown.

The modulated light from the first spectral modulator 300a is transmitted into the light guide 302. The light guide 302 mixes the modulated light (e.g., mixes the light received from one or more of the filters 304), and transmits the light to second spectral modulator 300b.

The second spectral modulator 300b modulates the light according to a second spectral response pattern. The second spectral modulator 300b can be similar to the second spectral modulator 250 described with respect to FIG. 2. For instance, the second spectral modulator 300 can include multiple different channels to modulate light in different ways. As an example, in the example shown in FIG. 3, the second spectral modulator 300b includes five channels 308a-e, each having a respective filter 310. The filters 310 can be similar to the filters 126 described with respect to FIG. 1. Further, each channel 308a-e is configured to receive a portion of the light transmitted from the light guide 302, and modulate the light according to a different respective filter 310.

Further, in a similar manner to that described with respect to FIG. 2, the second spectral modulator 300b includes an array of photodetectors 312a-e, each configured to measure modulated light (e.g., the intensity of light) from a corresponding one of the channels 308a-e, and to transmit the measurements to the electronic control device 110. Example photodetectors include photoemission or photoelectric devices, semiconductor devices, photovoltaic devices, thermal devices, or photochemical devices operable to convert light photons into electric current. Similarly, the measurements from each of the photodetectors 312a-e can be weighted differently relative to measurements from each of the other photodetectors 312a-e. For instance, each of the photodetectors 312a-e can be operated according to a particular gain and/or according to a particular integration time.

This configuration can provide various benefits. For example, in this configuration, a spectrometer 300 can modulate and filter light selectively using the spectral modulator 300b, without requiring the use of multiple different channels in the first spectral modulator 300a and/or the light guide 302. This can reduce the complexity and/or production cost of the spectrometer 300 (e.g., by removing the number of components used to construct the spectrometer 300).

Although the spectrometer 300 shown in FIG. 3 includes a first spectral modulator 300a having three filters and a second spectral modulator 300b having five channels and corresponding filters, this is merely an illustrative example. In practice, a spectrometer 200 can include any number of filters for the first spectral modulator 300a (e.g., one, two, three, four, or more), and any number of channels and corresponding filters for the second spectral modulator 300b (e.g., one, two three, four, or more).

An example spectral estimation technique is described below, making reference to the following notation:

$\lambda$: wavelength; $\lambda \in \lambda_{min}, \lambda_{max}$
N: number of measurements acquired by the spectrometer
m: number of channels for the first spectral modulator
n: number of channels for the second spectral modulator
$\Delta\lambda$: step of wavelength discretization; $\Delta\lambda = (\lambda_{max} - \lambda_{min})/(N-1)$
$x(\lambda)$: actual spectrum of a sample under study (power distribution versus wavelength $\lambda$
P: power of light
$[F_1^1(\lambda), F_1^2(\lambda), \ldots, F_1^m(\lambda)]$: spectral response of individual filter of filters array for the first spectral modulator
$[T_1^1, T_1^2, \ldots, T_1^m]$: transmission weight factors controlled by individual pixel of liquid crystal array used in the first spectral modulator.
$[F_2^1(\lambda), F_2^2(\lambda), \ldots, F_2^m(\lambda)]$: spectral response of individual filter of filters array for the second spectral modulator;
$[T_2^1, T_2^2, \ldots, T_2^n]$: weighting factor of each filter channels for the second spectral modulator.

When a light with unknown spectrum $x(\lambda)$ is incident on a photodetector, the multiplexed intensity of light, P, will be measured which is a sum of intensity at each wavelength, $$P = \sum_{\lambda=\lambda_{min}}^{\lambda_{max}} x(\lambda) \quad (1)$$

The spectrum $x(\lambda)$ is reconstructed from measured P after spectral modulation. The final reading of the photodetector (or multiplexing of photodetector array) can be calculated by $$P = \sum_{\lambda=\lambda_{min}}^{\lambda_{max}} H(\lambda)x(\lambda) \quad (2)$$

Where transfer function, $H(\lambda)$ can be defined by the filter spectral response and corresponding transmission (or weighting factor) as follows for an n channel filter array:

$$H(\lambda) = \sum_{i=1}^{n} F_i(\lambda)T_i \quad (3)$$

where $F_i(\lambda)$ and $T_i$ are the filter spectral response and the weighting factor for the ith channel of filter, respectively.

For the photodetector array shown in FIG. 2, the measurement of each channel of the detector will be weighted by gain or integration time of each photodetector beneath respective filter, or a weighting factor array directly applied to the measurement result of each channel of detectors. The final power received will be the sum of all power received by each channel of photodetector:

$$P = \sum_{i=1}^{n} P_i \quad (4)$$

The transfer function of the first spectral modulator, $H_1(\lambda)$, and the transfer function of the second spectral modulator, $H_2(\lambda)$ can be derived from Eq. (3). The final spectral modulation function H can be expressed as follows (assuming the spectrum will not be modified by the light guide):

$$H(\lambda) = H_1(\lambda) \cdot H_2(\lambda) \quad (5)$$

As an example, in FIG. 1, there are three filter channels for the first spectral modulator and five filter channels for the second spectral modulator. Further, each channel of the second spectral modulator will have one independent set of filters (e.g., in a channel of the first spectral modulator) and a corresponding channel in the light guide. Thus, the first spectral modulation will have different transmission settings to output to each channel of the second spectral modulator. This facilitates the modulation of light in a more arbitrary manner, thereby improving reconstruction accuracy.

The light can be measured with a randomly selected transmission/weighting vector for both spectral modulators for N times. The transfer function can be an N×N matrix, H' and the light measurements from the photodetector/photodetector detector array can be a N×1 matrix P'.

$$H' = \begin{bmatrix} H^1(\lambda) \\ H^2(\lambda) \\ H^3(\lambda) \\ \ldots \\ H^N(\lambda) \end{bmatrix}, P' = \begin{bmatrix} P^1 \\ P^2 \\ P^3 \\ \ldots \\ P^N \end{bmatrix} \quad (6)$$

A matrix relationship exists as follows:

$$P^i = \sum_{\lambda=\lambda_{min}}^{\lambda_{max}} H^i(\lambda) * x(\lambda) \quad (7)$$

The reconstruction of the spectrum becomes a linear system problem, as shown in Eq. (7). Various algorithms, such as the least square algorithm, can be used to reconstruct $x(\lambda)$ from pre-set parameters of H' and measured P'.

In some cases, after defining wavelength range and resolution for the measurement, the spectral response of the two spectral modulators can be measured by randomly selected transmission vectors. Reconstruction can proceeded based on the measured spectral modulation function matrix and measured light received by photodetectors. After the spectrum is reconstructed, a reconstruction error can be calculated by $$\text{error} = \sum_{i=1}^{N} \left[ P_i - \sum_{\lambda=\lambda_{min}}^{\lambda_{max}} H_i(\lambda) \cdot x(\lambda) \right] \quad (8)$$

If the calculated reconstruct error is accepted, the reconstructed spectrum can be output as the result. Otherwise, another set of transmission vectors can be applied to the spectral modulators, and another measurement can be conducted.

Figure 4:
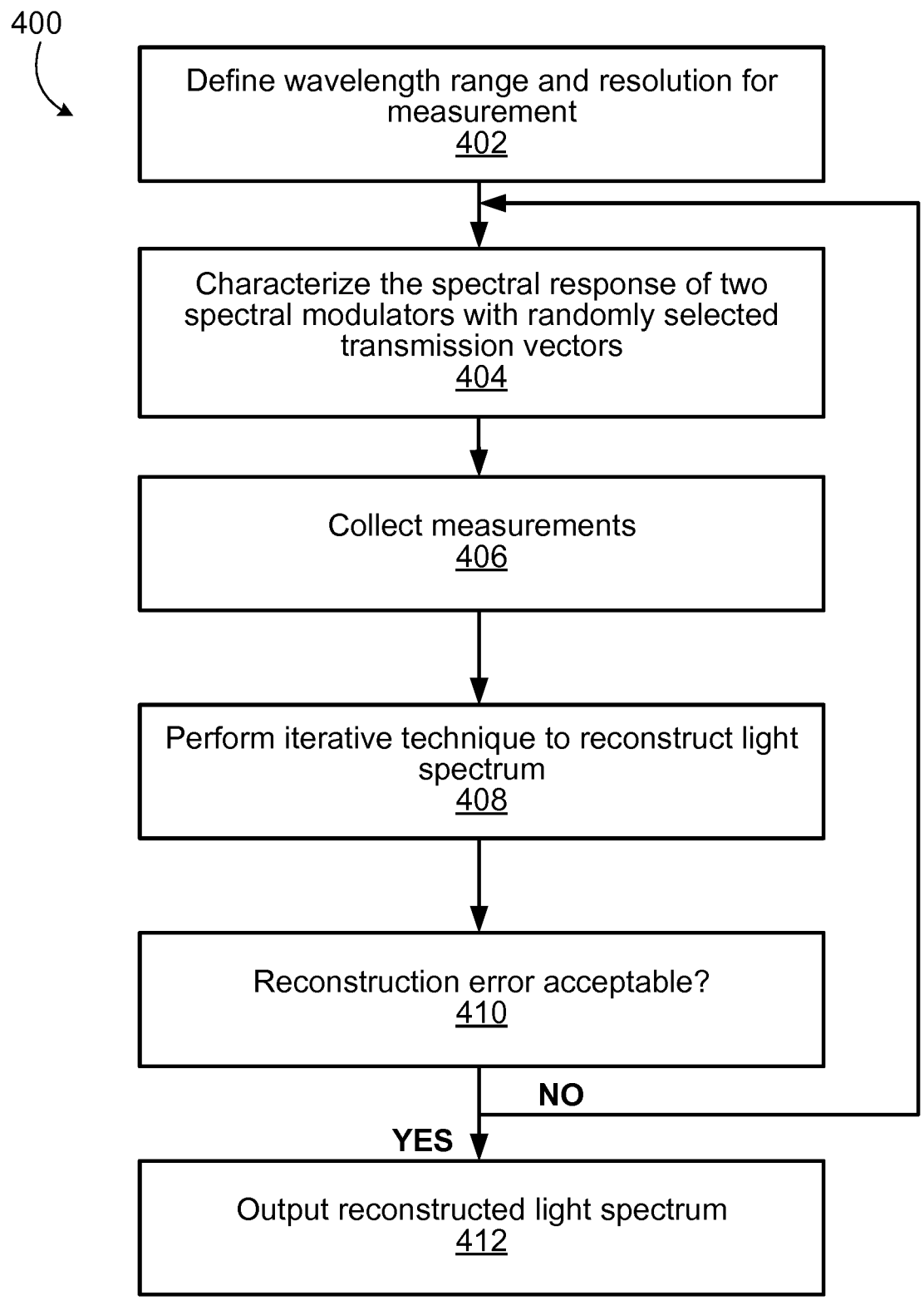
FIG. 4 is a flow chart diagram of an example process for estimating a light spectrum of a sample of light.

As an example, a process 400 for estimating the light spectrum of a sample of light in shown in FIG. 4. The process 400 can be performed, for example, using one or more of the spectrometers 100, 200 and/or 300 shown in FIGS. 1-3.

In the process 400, a wavelength range and measurement resolution is defined for the light spectrum analysis (step 402). For instance, a light spectrum can be estimated over a particular range of wavelengths (e.g., wavelengths between X and Y), and the light spectrum can be estimated according to a particular spectral resolution (e.g., a spectral resolution of Z).

The combined spectral response of two spectral modulators is characterized with randomly selected transmission vectors for each modulator (step 404). For example, the transmission vectors $[T_1^1, T_1^2, \ldots, T_1^m]$ and $[T_2^1, T_2^2, \ldots, T_2^n]$ can be randomly selected, so as to produce different transfer function combinations based on Eq. (3) and Eq. (5). For instance, sample light can be modulated using the first and second spectral modulators described with respect to FIGS. 1-3. As an example, referring to FIG. 1, different combinations of filters 116 and channels 124$a$-$e$ can be selected (e.g., randomly).

Measurements of the modulated light are collected (step 406). For example, modulated light can be measured using the photodetectors or array of photodetectors described with respect to FIGS. 1-3.

An iterative technique is performed to reconstruct the light spectrum (step 408). For instance, the light spectrum can be reconstructed using one or more of the techniques described above.

The error metric is calculated for the reconstruction (step 410). For instance, an error metric can be calculated using one or more of the techniques described above.

If the error metric is acceptable (e.g., if the error metric is less than a particular threshold value), the reconstructed light spectrum is output (step 412). In some cases, the reconstructed light spectrum can be stored for further future reference and/or processing. In some cases, the reconstructed light spectrum can be presented to a user for review (e.g., using a suitable user interface).

If the error metric is unacceptable (e.g., if the error metric is greater than a particular threshold value), steps 402, 404, 406, and 410 can be repeated until the error metric is acceptable.

Example experimental data is shown in FIGS. 4A, 4B, and 5A-5C.

Figure 5A:
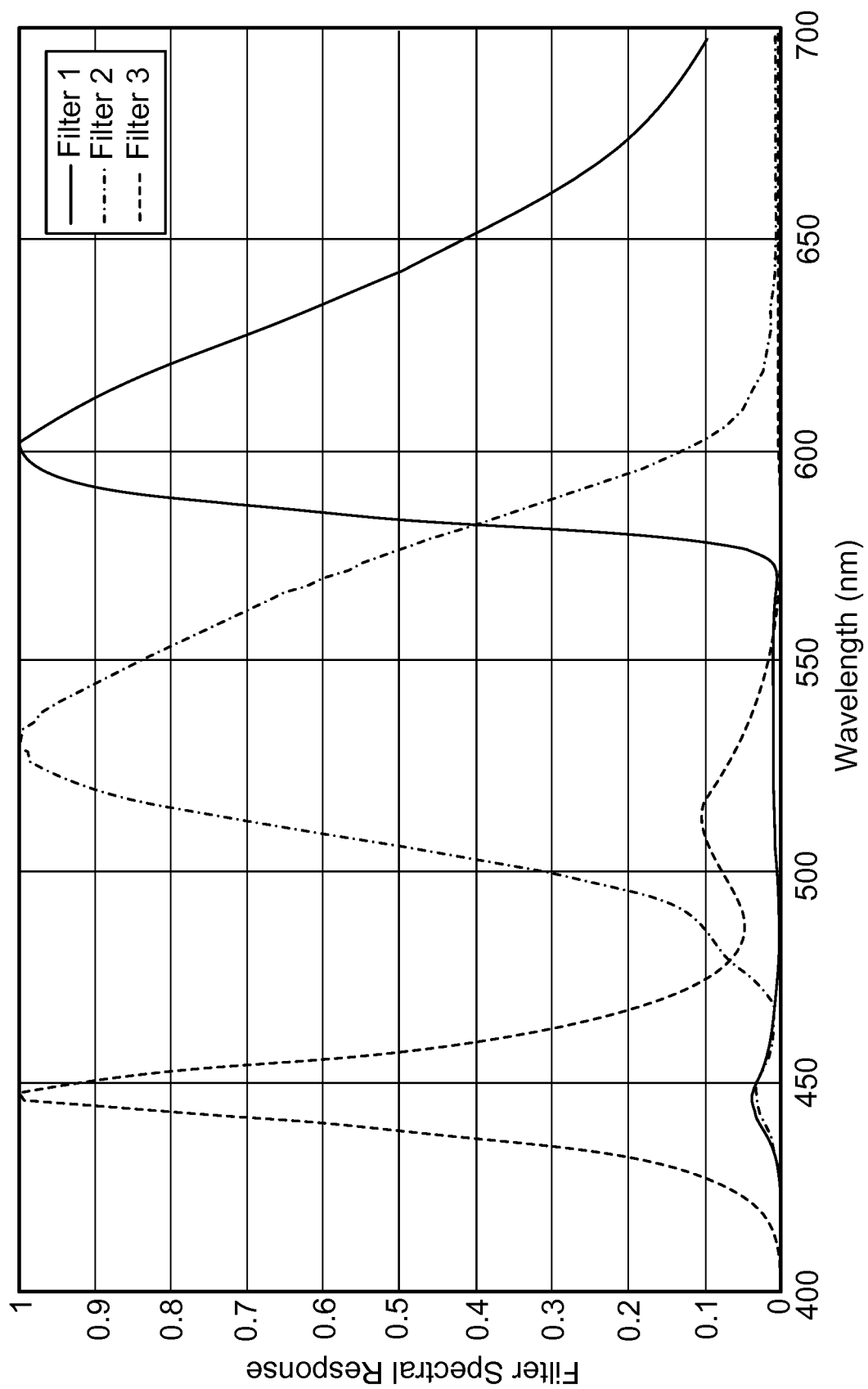
FIGS. 5A-5B are plots of the spectral response of two example filters arrays.
Figure 5B:
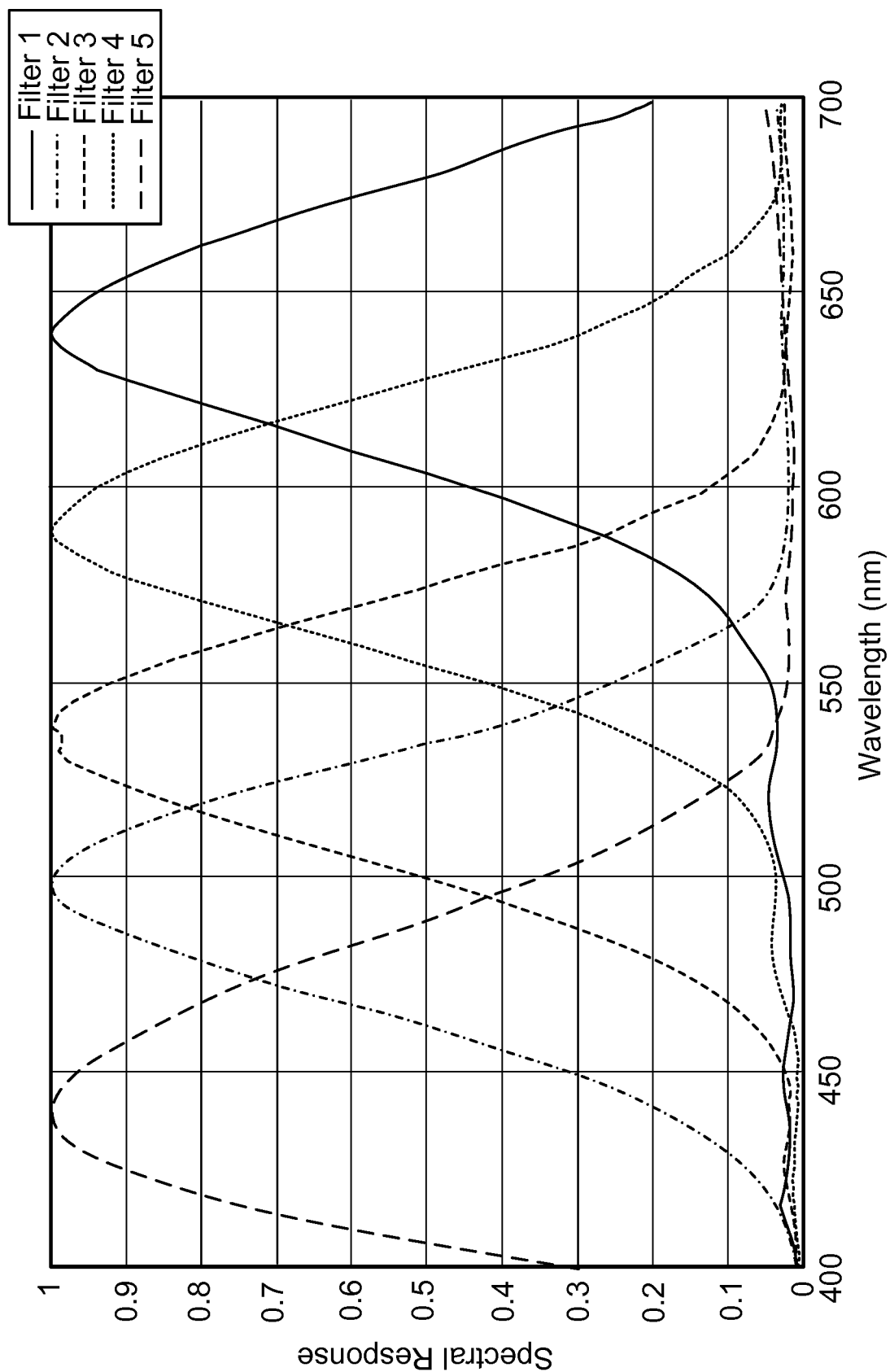

FIGS. 5A and 5B show the spectral response of two filters arrays, respectively (e.g., corresponding to example filters used in the first and second spectral modulators shown in FIGS. 1-3). In this example, FIG. 5A shows the spectral response of three filters used for a first spectral modulator, transmission of which can be modulated by a light crystal light regulation device. Further, in this example, FIG. 5B shows the spectral response of five filters used for a second spectral modulator, transmission of which can be modulated by a light crystal light regulation device or a detector with selective gain and/or integration time.

Figure 6A:
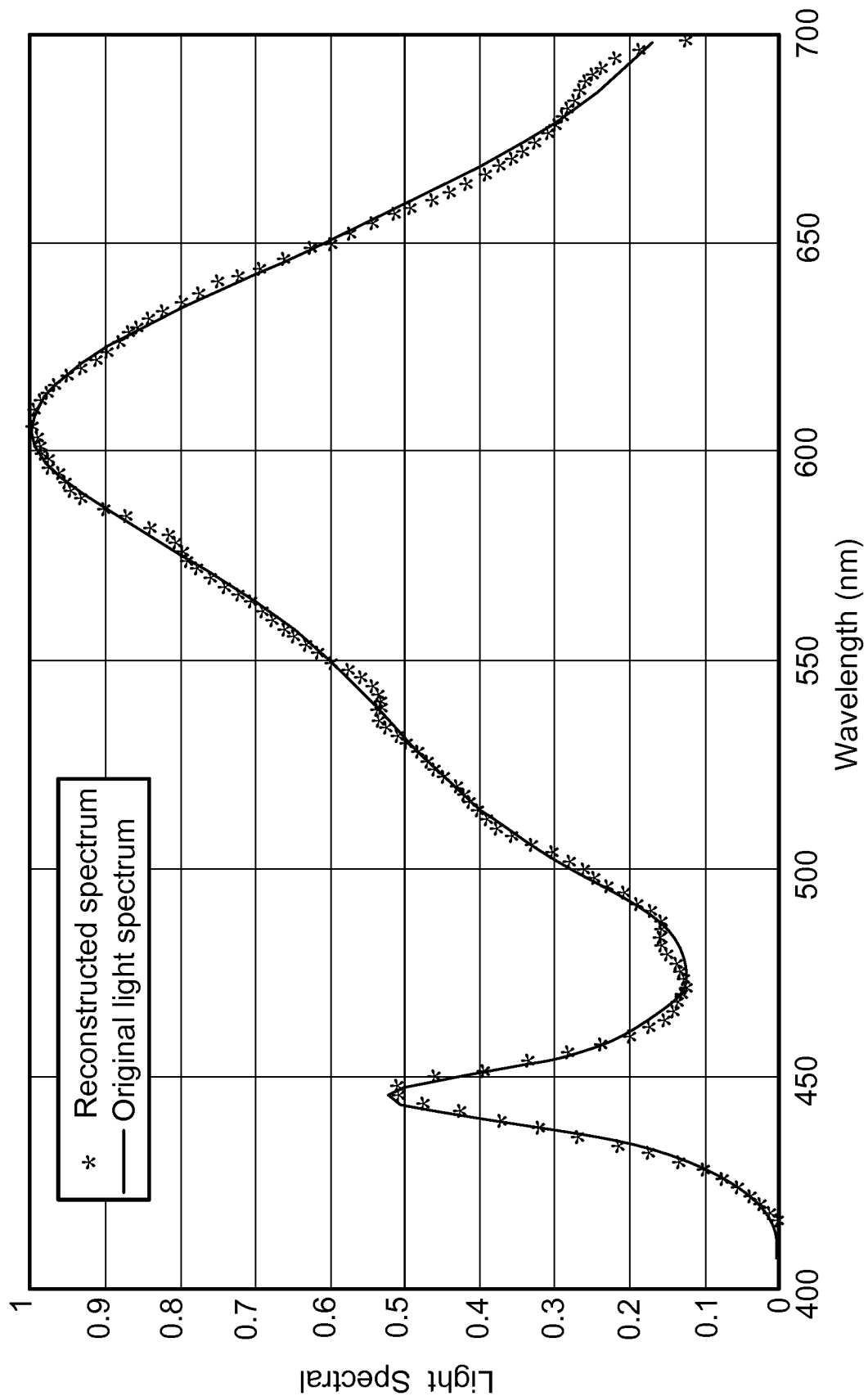
FIGS. 6A-6C are plots of actual spectra versus corresponding stimulated reconstructed spectra for example light sources.
Figure 6B:
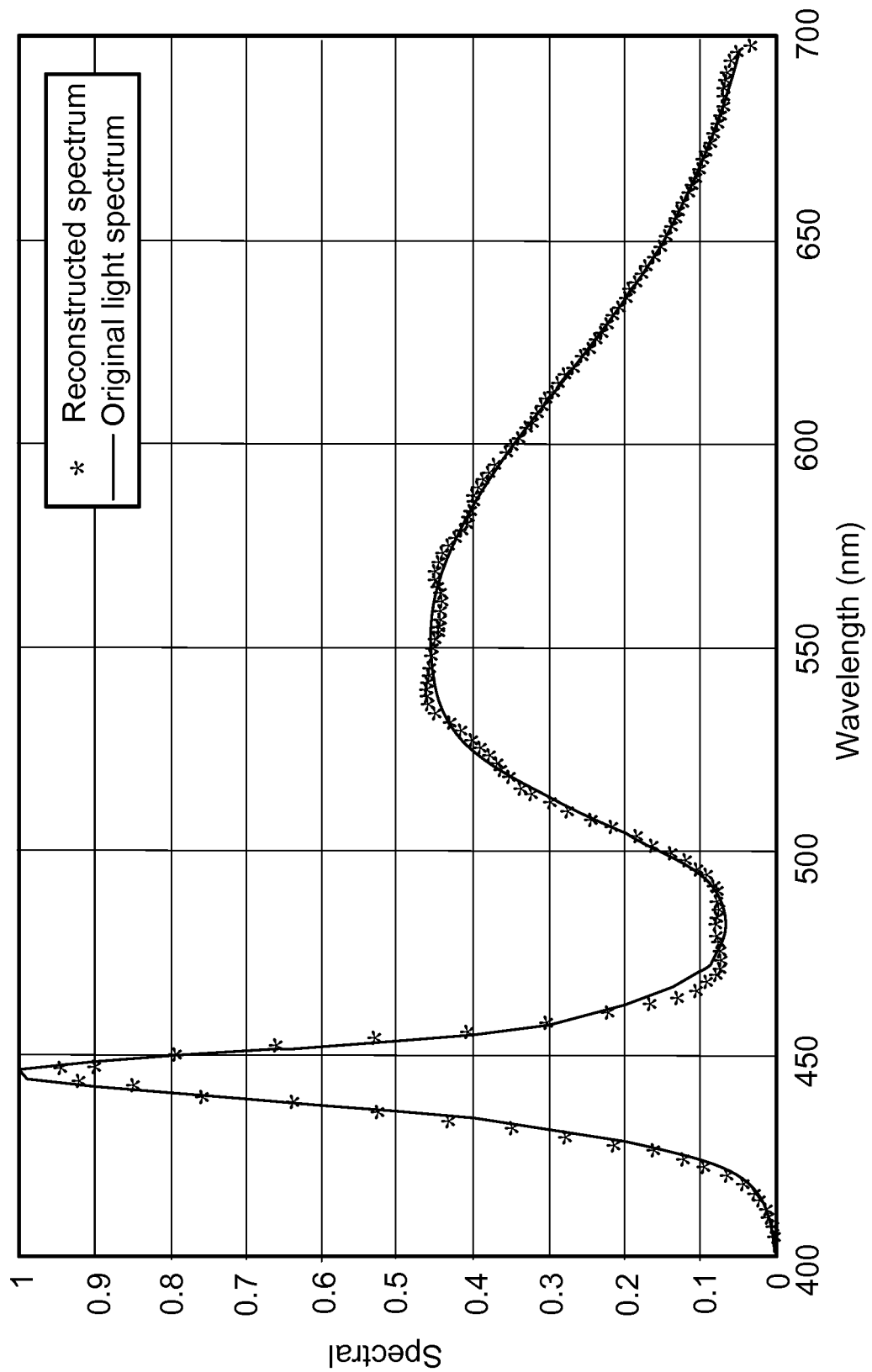
Figure 6C:
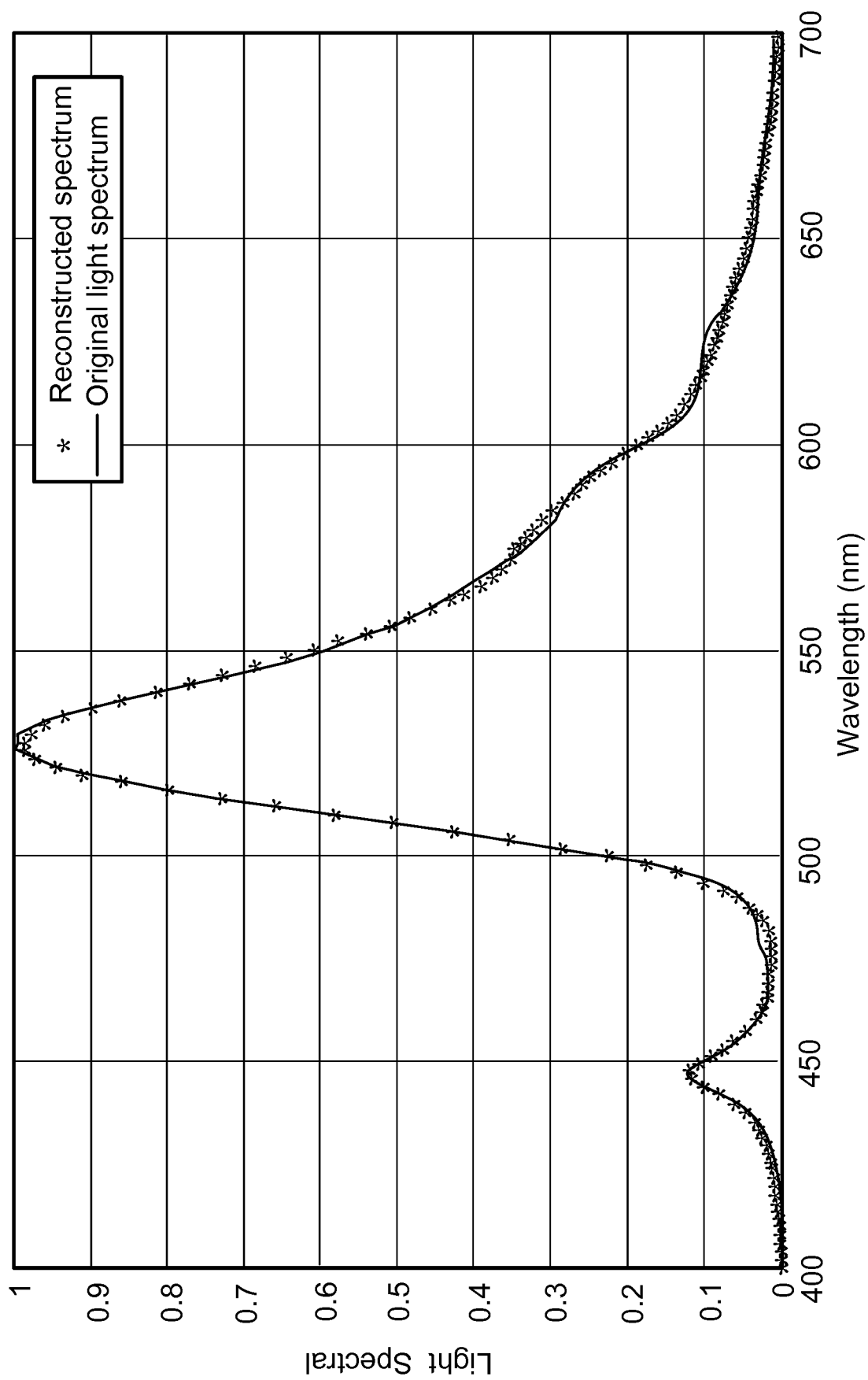

FIGS. 6A-6C show three light emitting diode (LED) light source spectra reconstructions, respectively, based on the systems and techniques describe herein, with respect to the filters shown in FIGS. 5A and 5B. The three light sources show different spectra with different color temperatures. Solid curves indicate the original spectra used as the input light source (e.g., the sample light). A series of randomly selected transmission vectors is applied to the spectral modulators to obtain spectral modulation function matrix. Thus, light received at photodetectors can be simulated based on Eq. (2). The spectrum is reconstructed using a least square method (indicated by the dotted curves), using simulated light intensity measurements and a spectral modulation function matrix. As shown in FIGS. 6A-6C, all three reconstructed spectra show close agreement with the original spectra, demonstrating the effectiveness of the systems and techniques described herein in reconstructing spectra.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the spectrometers 100, 200, and/or 300 (e.g., the electronic control devices 110) can be implemented using digital electronic circuitry, or in computer software, firmware, or hardware, or in combinations of one or more of them. In another example, the processes shown in FIG. 4 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 7:
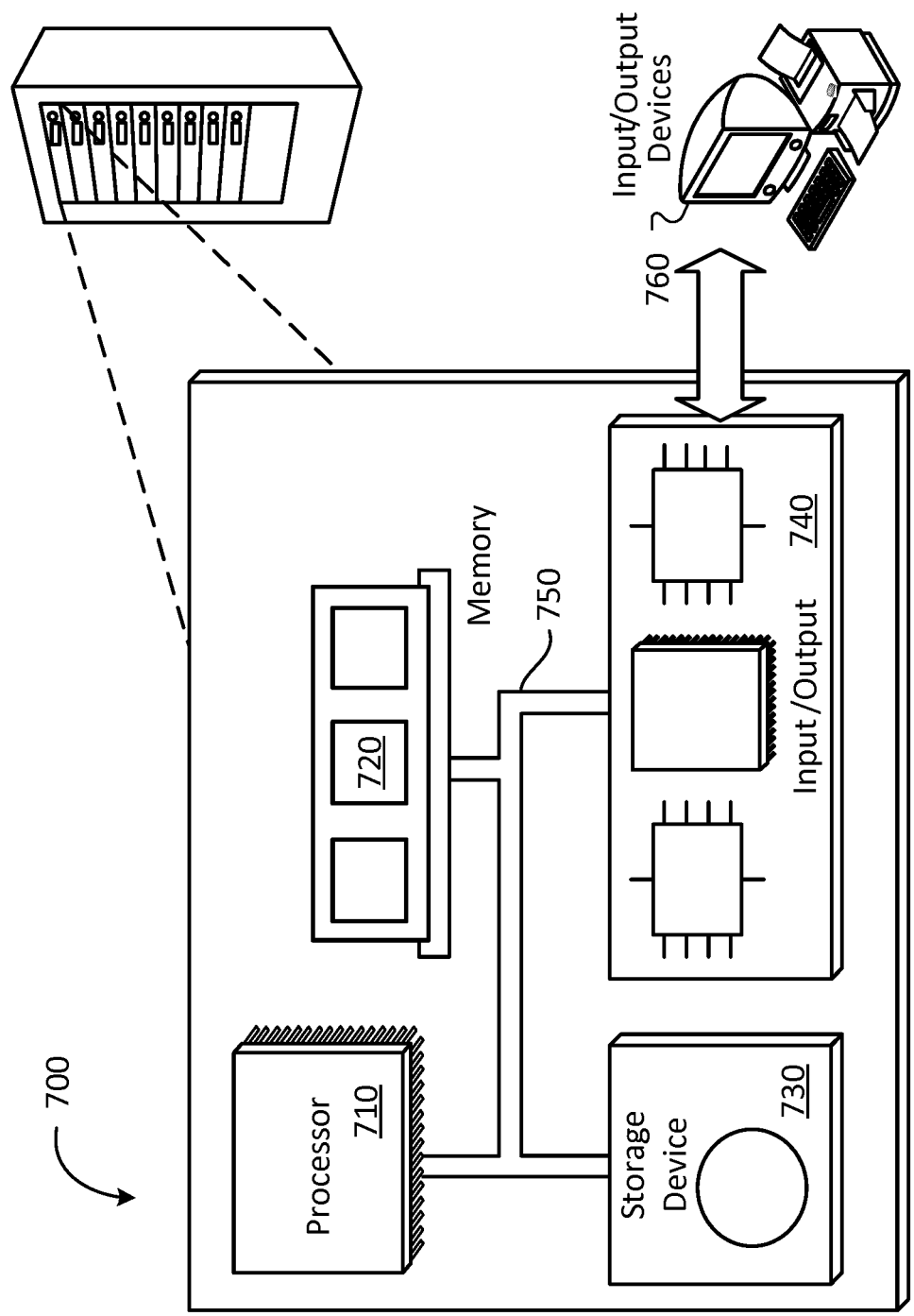
FIG. 7 is a schematic diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. In some implementations, the computer system 700 can be used to control the operation of a spectrometer. For instance, the electronic control device 110 shown in FIGS. 1, 2, and/or 3 can include a computer system 700 to control the operation of one or more components of a spectrometer and/or process measurement data. The processor 710 is capable of processing instructions for execution within the system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

What is claimed is:

1. A system comprising:
   a first spectral modulator comprising a plurality of first light filters, each first light filter having a respective spectral response pattern that differs from a spectral response pattern of each of the other first light filters; wherein for each first light filter, a respective liquid crystal spatial light modulator (SLM) is configured to regulate the transmission of sample light into or out of the first light filter;

a second spectral modulator;
a light guide optically coupling the first spectral modulator and the second spectral modulator;
a photodetector; and
an electronic control device communicatively coupled to the photodetector,
wherein the first spectral modulator is operable to:
receive sample light, and
modulate the sample light according to a first spectral response pattern to produce first modulated light;
wherein the second spectral modulator is operable to:
receive the first modulated light from the first spectral modulator via the light guide,
modulate the first modulated light according to a second spectral response pattern to produce second modulated light, and
transmit the second modulated light to the photodetector;
wherein the photodetector is operable to:
measure an intensity of the second modulated light incident on the photodetector, and generate one or more signals corresponding to the intensity of the second modulated light,
wherein the electronic control device is operable to determine a spectral distribution of the sample light based on the one or more signals.

2. The system of claim 1, wherein the first spectral modulator is operable to modulate the sample light according to the first spectral response pattern by selectively actuating one or more of the first liquid crystal SLMs of the first spectral modulator.

3. The system of claim 1, wherein the second spectral modulator comprises a plurality of second light filters, each second light filter having a respective spectral response pattern that differs from a spectral response pattern of each of the other second light filters.

4. The system of claim 3, wherein the second spectral modulator comprises, for each second light filter, a respective second light regulation device operable to regulate the transmission of sample light into or out of the second light filter.

5. The system of claim 4, wherein the second light regulation devices comprise liquid crystal spatial light modulators (SLMs).

6. The system of claim 4, wherein the second spectral modulator is operable to modulate the first modulated light according to the second spectral response pattern by selectively actuating one or more of the second light regulation devices of the second spectral modulator.

7. The system of claim 1, wherein the first spectral modulator comprises a plurality of light channels, wherein each light channel of the first spectral modulator comprises:
the plurality of first light filters; and
the plurality of first liquid crystal SLMs.

8. The system of claim 7, wherein the first spectral modulator is operable to modulate the sample light according to the first spectral response pattern by selectively actuating one or more of the first liquid crystal SLMs of one or more of the light channels of the first spectral modulator.

9. The system of claim 7, wherein the light guide comprises a plurality of light channels, wherein each light channel of the light guide comprises a respective light guide operable to receive first modulated light from a corresponding light channel of the first spectral modulator, and mix the first modulated light.

10. The system of claim 7, wherein the second spectral modulator comprises a plurality of light channels, wherein each light channel of the second spectral modulator comprises a respective second light filter, each second light filter having a respective spectral response pattern that differs from a spectral response pattern of each of the other second light filters.

11. The system of claim 10, wherein the second spectral modulator further comprises, for each light channel, a respective second light regulation device operable to regulate the transmission of light into or out of the second spectral modulator.

12. The system of claim 10, wherein the second spectral modulator is operable to modulate the first modulated light according to the second spectral response pattern by selectively actuating one or more of the second light regulation devices of the second spectral modulator.

13. The system of claim 10, wherein the photodetector comprises a plurality of light channels, wherein each light channel of the photodetector comprises a respective photodetector element operable to measure an intensity of the second modulated light received from a corresponding light channel of the second spectral modulator.

14. The system of claim 10, wherein the photodetector comprises a single photodetector element operable to measure an intensity of the second modulated light received from any of the light channels of the second spectral modulator.

15. The system of claim 1, further comprising a diffuser operable to diffuse the sample light and transmit the diffused sample light to the first spectral modulator.

16. A system comprising:
a first spectral modulator;
a second spectral modulator comprising a plurality of light channels;
a light guide optically coupling the first spectral modulator and the second spectral modulator;
a plurality of photodetectors optically isolated from one another where each photodetector corresponds to a light channel of the plurality of light channels; and
an electronic control device communicatively coupled to the plurality of photodetectors;
wherein the first spectral modulator is configured to:
receive sample light, and
modulate the sample light according to a first spectral response pattern to produce first modulated light;
wherein the second spectral modulator configured to:
receive the first modulated light from the first spectral modulator via the light guide, modulate the first modulated light according to a second spectral response pattern to produce second modulated light, and
transmit the second modulated light from the plurality of light channels to the plurality of photodetectors;
wherein the plurality of photodetectors are configured to:
measure an intensity of the second modulated light from the plurality of light channels incident on the plurality of photodetectors, wherein one or more first photodetector measurements of the plurality of photodetectors is weighted differently from one or more second photodetector measurements of the plurality of photodetectors; and
generate one or more signals corresponding to the intensity of the second modulated light, wherein the electronic control device is operable to determine a spectral distribution of the sample light based on the one or more signals.

* * * * *